Patented Dec. 12, 1944

2,364,719

UNITED STATES PATENT OFFICE 2,364,719

HYDROGENATED LIQUID HYDROCARBONS

Russell L. Jenkins, Anniston, Ala., assignor to Monsanto Chemical Company, St. Louis, Mo., a corporation of Delaware No Drawing. Application December 26, 1940, Serial No. 371,786

9 Claims. (Cl. 260—666)

This invention relates to a new composition of matter and more particularly to the product obtained by the partial or incomplete hydrogenation of the by-product hydrocarbons formed in the preparation of biphenyl by the pyrolysis of benzene.

In the commercial preparation of biphenyl by the pyrolysis of benzene, benzene vapors are passed through heated tubes or screens, through molten metals or through molten salts. The main products formed in these processes are biphenyl, hydrogen and higher boiling hydrocarbons. The high boiling fraction, which boils above about 370° C., is a light colored solid and waxy in appearance. Heretofore, little use has been found for this waxy by-product which is unavoidably formed in the various biphenyl syntheses.

I have discovered that a very valuable composition of matter can be prepared by the partial or incomplete hydrogenation of this waxy, high boiling mixture of the hydrocarbons obtained as a by-product in the pyrolysis of benzene. If this high boiling material be completely hydrogenated, a high boiling waxy solid is obtained which has physical properties similar to the unhydrogenated product. However, the material prepared according to the process hereinafter described is a colorless, odorless liquid which does not solidify at or below room temperatures. This hydrogenated, liquid product possesses many valuable properties, such as a very high boiling point, a very low vapor pressure at ordinary temperatures, a high resistance to water, unusual solvent and other properties.

The material made according to my process is valuable as a lubricant for machinery, particularly where the absence of gum formation is of prime importance; as a protector for metal parts against corrosion, especially where both a lubricant and a corrosion resistant oil are desired; as a textile lubricant and softener, particularly for rayon and woolen goods; as a constituent for leather dressings, particularly in those formulations used for softening leathers; as a solvent and penetrant in the dyeing of leather; as a dye assistant in combination with sulfonated oils or sulfonated aliphatic and aromatic compounds; as a constituent of detergent formulations; as a heat transfer medium; as a waterproofing agent in building compositions, such as insulating boards; as a constituent of dipping solutions for wood to impart water resistance and also in combination with active insecticidal ingredients such as pentachlorophenol; as a plasticizer for resins and plastic materials such as vinyl resins, resins made by the copolymerization of vinyl chloride and vinyl acetate, Vinylite resins, chlorinated rubber, and the like, either alone or in combination with other plasticizers; as a component in coating compositions to impart additional plasticizing properties to the dried film; as a constituent in wax compositions, such as floor and polishing waxes; as a cable oil; as a dielectric oil; as a selective solvent for industrial processing, such as in the extraction of phenolic bodies from waste coke and ammonia liquors; as a power transfer medium, such as used in hydraulic brakes and fluid clutches, and as an intermediate in the preparation of other valuable products. In addition, polystyrene resins in amounts from about 0.2 to 1.0% may be added to my new product to improve its viscosity index— about 0.5% of the polystyrene resin will raise the viscosity index from about 0 to 110.

Because of the outstanding physical and chemical properties which characterize my product, other uses will be apparent.

As a starting material for my product, I may use the high boiling hydrocarbons obtained in the pyrolysis of benzene by any of the known methods mentioned hereinbefore. A sample of the high boiling fraction, distilling above the boiling point of biphenyl, obtained in the pyrolysis of benzene by passing benzene vapors through molten lead, essentially as disclosed in United States Letters Patent No. 1,894,283, had the following physical properties:

Specific gravity at 25° C _____ 1.10

Distillation range:
At 1st drop _____ °C__ 370
5% _____ °C__ 373
10% _____ °C__ 374
50% _____ °C__ 382
60% _____ °C__ 384
70% _____ °C__ 387
80% _____ °C__ 393
90% _____ °C__ Approx. 400

Solidification point:
Primary holding point (first crystals appear) _____ °C__ 140
Secondary holding point (total solidification takes place) _____ °C__ 56

Odor:
Little or none at room temperature
Slightly aromatic at higher temperatures Solubility in—
95% alcohol
at 25° C___ Less than 0.03 g./100 g. solvent
95% alcohol at 75° C_____ 1.3 g./100 g. solvent
Benzene at 25° C_____ 5
Benzene at 75° C_____ 34
Water _____ Nil The composition of the high boiling fraction, distilling above the boiling point of biphenyl, will vary somewhat with the method, operating conditions and catalyst used to convert the benzene to biphenyl. For example, the initial boiling point of the high boiler may be below about 370° C. and, in general, within the range of 350 to 375° C.

The examples set forth hereinafter illustrate the process by which my product can be prepared. The starting material was the distilled, high boiling, hydrocarbon mixture previously described. This material is conventionally known as biphenyl high boiler.

*Example 1.*—Seven hundred (700) grams of distilled biphenyl high boiler were heated with stirring with 14 grams of fresh nickel catalyst for 12 hours at 200° C. and 50 pounds of hydrogen pressure. After removing the nickel by filtration, 14 grams of fresh nickel catalyst were added and the hydrogenation carried out with stirring at 235–240° under about 900 pounds of hydrogen pressure for 15 hours. After cooling the autoclave and its contents, the catalyst was removed by filtration. A colorless, odorless, liquid product was obtained having a specific gravity of 1.017 at 25° C.

*Example 2.*—Seven hundred (700) grams of distilled biphenyl high boiler were heated with stirring in an autoclave at 200° C. under 50 pounds of hydrogen pressure with 14 grams of spent nickel catalyst recovered from a preceding similar hydrogenation. Stirring and heating were continued for 12 hours. At the end of this time, the nickel was removed by filtration and 14 grams of fresh nickel catalyst added. The hydrogenation was carried out at 220° to 225° C. under about 900 pounds of hydrogen pressure, with stirring, for 15 hours. After cooling the autoclave and its contents, the nickel was removed by filtration. A colorless, odorless, liquid product was obtained having a specific gravity of 0.951 at 25° C.

*Example 3.*—Seven hundred (700) grams of distilled biphenyl high boiler were heated with stirring for 12 hours at 200° C. and under 50 pounds of hydrogen pressure in an autoclave with the catalyst recovered from the preceding example. After removing the spent nickel by filtration, 14 grams of fresh active nickel catalyst were added and the hydrogenation carried out with stirring at 220° to 225° C. under 900 pounds of hydrogen pressure for 16.5 hours. At the end of this time, the autoclave was cooled and a test sample taken. The specific gravity of the liquid was 0.973 at 25° C. An additional 7 grams of fresh nickel catalyst were added and the hydrogenation continued at 220° to 225° C. under 900 pounds pressure for 10 hours. After cooling, the nickel was removed by filtration and a colorless liquid product having a specific gravity of 0.956 was obtained.

*Example 4.*—Seven hundred (700) grams of distilled biphenyl high boiler were charged into an autoclave fitted with a suitable stirring agitator. Fourteen (14) grams of fresh nickel catalyst were added and the hydrogenation carried out at 165° to 225° C. under 500 to 900 pounds pressure with stirring. After cooling the autoclave and its contents, the nickel was removed by filtration. A colorless, odorless, liquid product was obtained having a specific gravity of 0.950 at 25° C.

*Example 5.*—Three hundred (300) pounds of biphenyl high boiler were charged into a stirring autoclave and pretreated with 6 pounds of nickel catalyst at 200° C. and under 50 pounds of hydrogen pressure for 12 hours. The catalyst used to pretreat the biphenyl high boiler was not removed. Six pounds of fresh nickel catalyst were added to the contents of the autoclave and the hydrogenation carried out with stirring at 175° to 235° C. under a pressure varying from 300 to 900 pounds for 4 hours, at the end of which time the specific gravity of the liquid product was 0.9825 at 25°/25° C. These 300 pounds of the biphenyl high boiler absorbed a total of about 15.3 pounds of hydrogen. The final product was obtained by removing the nickel catalyst by filtration and had the following characteristic properties:

Appearance: Colorless mobile oily liquid, color Hazen scale #11
Odor: Essentially odorless
Specific gravity: 0.9825 at 25°/25°
Refractive index: 1.5445 at 25° C.
Stability: Stable at the boiling point; does not oxidize or form gum
Distillation range:

| | | |
|---|---|---|
| 1st drop | °C | 335.5 |
| 25% | °C | 339.0 |
| 50% | °C | 341.0 |
| 70% | °C | 343.0 |
| 97% | °C | 385.0 |
| Dry | °C | 385.0 |

Flash point: 345° F. (173° C.) Tag open cup
Flame point: 385° F. (196° C.) Tag open cup
Viscosity:
 22 centistokes at 40° C.
 3.6 centistokes at 100° C.
 45 Saybolt Universal seconds at 172° F.
 240 Saybolt Universal seconds at 77° F.
Solubility: Immiscible with water. Miscible in all proportions at room temperature with benzene, ether, acetone and petroleum ether. Soluble to the extent of 6:100 by volume in 95% ethyl alcohol at 30° C.
Totally liquid at −30° C.

In the examples set forth hereinabove, the hydrogenations were carried out at 175° to 235° C. and at pressures of from 300 to 900 pounds per square inch. However, temperatures of 100 C. or below and preferably within the range of 125° C. to 250° C. and a pressure as low as 40 pounds per square inch and preferably within the range of 200 to 1200 pounds per square inch may be used. The temperatures and pressures necessary to produce my preferred product will be dependent upon the degree of agitation in the autoclave during the hydrogenation and the activity of the catalyst.

Although I prefer to carry out the hydrogenation until the partially hydrogenated product has a specific gravity of approximately 0.080–0.990 at 25° C., I may introduce more or less hydrogen. However, if the hydrogenation has been insufficient or excessive, a solid phase will separate on cooling to room temperatures. The produce containing this solid phase may be chilled to temperatures as low as −30° C., and the solid phase, which precipitates under these conditions, separated from the liquid phase. The liquid product thus obtained has properties similar to those which characterize my preferred product and this material can be used for the purposes hereinbefore described. I have observed that the partially hydrogenated biphenyl high boiler having specific gravities within the range of 1.05–0.955 at 25° C. remains liquid at or below room temperatures. The fraction of partially hydrogenated high boilers having specific gravities within the range of 0.995–0.970 at 25° C. remains liquid, or has a pour point as low as −30° C. and lower, and this fraction of products has a refractive index which ranges from 1.560–1.533 at 25° C. The following table illustrates the refractive indices of the liquid products falling within the specific gravity range of 0.995–0.960:

| Specific gravity at 25° C. | Refractive index at 25° C. |
| --- | --- |
| 0.995 | 1.560 |
| 0.982 | 1.544 |
| 0.977 | 1.539 |
| 0.960 | 1.525 |

In the examples set forth hereinbefore, the molten biphenyl high boiler was either reduced directly with hydrogen and a fresh nickel catalyst or pretreated with fresh catalyst or spent nickel catalyst recovered from a preceding experiment prior to reduction with hydrogen and fresh catalyst. Without this pretreatment, it was found that larger amounts of nickel catalyst were frequently required to carry out the hydrogenation to the desired degree.

In addition to a nickel catalyst, I may use other hydrogenation catalysts such as the noble metal catalysts, platinum and palladium; or base metal catalysts, such as cobalt; or combinations, such as nickel-cobalt, nickel-mercury, nickel-thorium, nickel-molybdenum and nickel-chromium, etc. These catalysts may be either supported or unsupported.

Inasmuch as the above specification comprises illustrative embodiments of my invention, it is to be understood that the invention is not limited thereto except by the appended claims.

What is claimed is:

1. A partially hydrogenated hydrocarbon liquid mixture, characterized by having a specific gravity within the range of 1.05 to 0.970 at 25° C., and obtained by the partial catalytic hydrogenation of the mixture of normally solid hydrocarbons boiling above 350° C. at 760 mm. pressure and formed in the synthesis of biphenyl by the pyrolysis of benzene at elevated temperatures.

2. A partially hydrogenated hydrocarbon liquid mixture, characterized by having a specific gravity within the range of 1.05 to 0.970 at 25° C. and having a refractive index of at least 1.544 at 25° C., said liquid mixture being obtained by the partial catalytic hydrogenation of the mixture of normally solid hydrocarbons boiling above about 370° C. at 760 mm. pressure and formed in the synthesis of biphenyl by the pyrolysis of benzene.

3. A partially hydrogenated hydrocarbon liquid mixture, characterized by having a specific gravity within the range of 0.995 to 0.970 at 25° C. and a pour point below about −30° C., said liquid mixture being obtained by the partial catalytic hydrogenation of the mixture of normally solid hydrocarbons boiling above about 370° C. at 760 mm. pressure and formed in the synthesis of biphenyl by the pyrolysis of benzene.

4. A partially hydrogenated hydrocarbon liquid mixture, characterized by having a specific gravity within the range of 0.995 to 0.970 at 25° C., said liquid mixture being obtained by the partial hydrogenation, in the presence of an active nickel catalyst, of the mixture of normally solid hydrocarbons boiling above about 370° C. at 760 mm. pressure and formed in the synthesis of biphenyl by the pyrolysis of benzene at elevated temperatures.

5. A partially hydrogenated hydrocarbon liquid mixture, characterized by having a specific gravity within the range of 0.995 to 0.977 at 25° C. and a refractive index of at least 1.539 at 25° C., said liquid mixture being obtained by partially hydrogenating in the presence of an active nickel catalyst, at temperatures within the range of 100° C. to 250° C. and pressures within the range of 40 pounds to 1200 pounds per square inch, that fraction of the normally solid hydrocarbons distilling above about 370° C. at 760 mm. pressure and formed in the synthesis of biphenyl by the pyrolysis of benzene.

6. A partially hydrogenated hydrocarbon liquid mixture characterized by having a specific gravity within the range of 0.995 to 0.970 at 25° C. and having a refractive index of at least 1.544 at 25° C., said liquid mixture being obtained by partially hydrogenating in the presence of a catalyst, at temperatures within the range of 100° C. and 250° C. and pressures within the range of 40 pounds to 1200 pounds per square inch, the mixture of normally solid hydrocarbons boiling above about 370° C. at 760 mm. pressure and formed in the synthesis of biphenyl by the pyrolysis of benzene.

7. A partially hydrogenated mixture of hydrocarbon liquids having a specific gravity within the range of 0.995 to 0.970 at 25° C., a refractive index of at least 1.544 at 25° C., at least 50% of said hydrocarbon liquid boiling above about 339° C. at atmospheric pressure, said liquid mixture being obtained by the partial catalytic hydrogenation of a mixture of normally solid hydrocarbons boiling above about 350° C. at 760 mm. pressure and formed in the synthesis of biphenyl by the pyrolysis of benzene at elevated temperatures.

8. A partially hydrogenated hydrocarbon liquid mixture characterized by having a specific gravity within the range of 1.050 to 0.970 at 25° C., a refractive index of at least 1.544 at 25° C., and remaining liquid at temperatures substantially below room temperature, said liquid being obtained by the partial catalytic hydrogenation of a mixture of normally solid hydrocarbons boiling above about 350° C. at 760 mm. pressure and formed in the synthesis of biphenyl by the pyrolysis of benzene at elevated temperatures.

9. A partially hydrogenated hydrocarbon liquid mixture characterized by having a specific gravity within the range of 1.05 to 0.970 at 25° C., a refractive index above about 1.54 at 25° C., and the major portion of said liquid distilling within the range of 335.5° C. to 385° C., said liquid being obtained by the partial catalytic hydrogenation of a mixture of normally solid hydrocarbons boiling above 350° C. at 760 mm. pressure and formed in the synthesis of biphenyl by the pyrolysis of benzene at elevated temperatures.

RUSSELL L. JENKINS.